(No Model.) 2 Sheets—Sheet 1.
C. COLLINS.
SHAKING APPARATUS.
No. 366,460. Patented July 12, 1887.
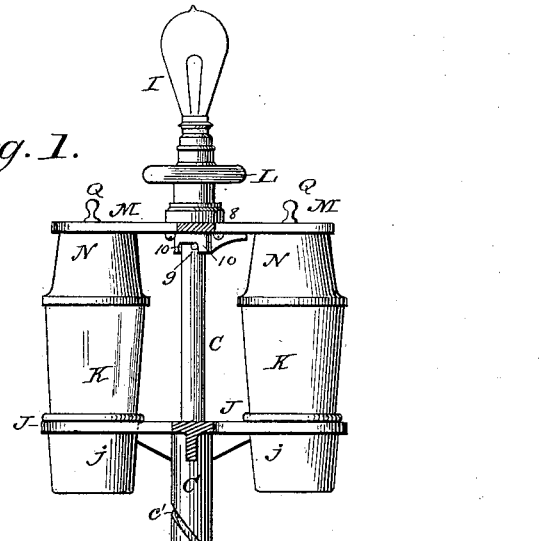
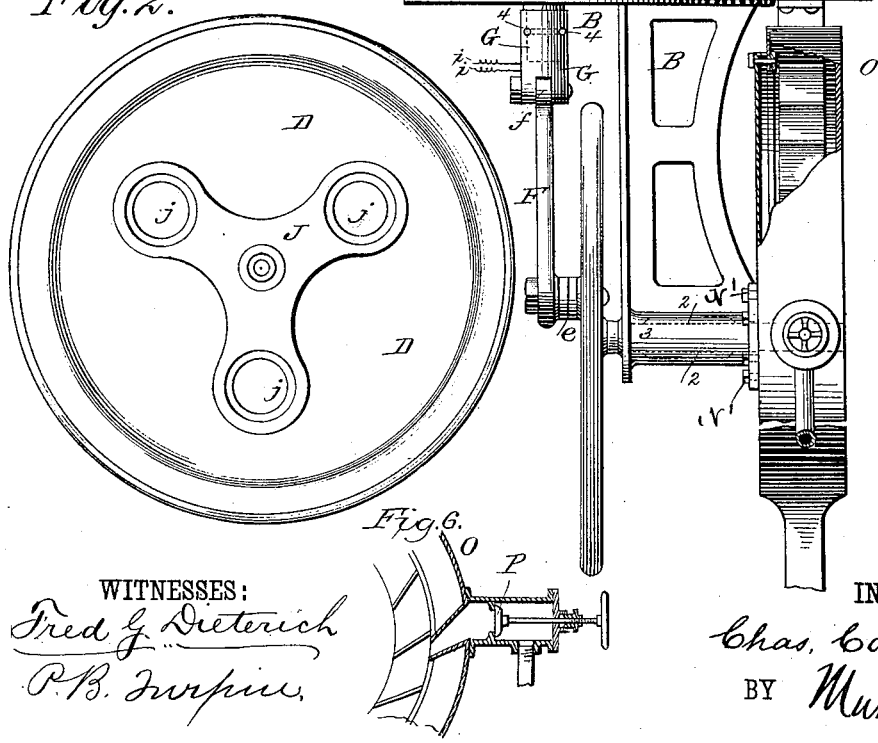
WITNESSES:
Fred G. Dieterich
P. B. Turpin
INVENTOR:
Chas. Collins
BY Munn & Co.
ATTORNEYS.

(No Model.) 2 Sheets—Sheet 2.
C. COLLINS.
SHAKING APPARATUS.
No. 366,460. Patented July 12, 1887.
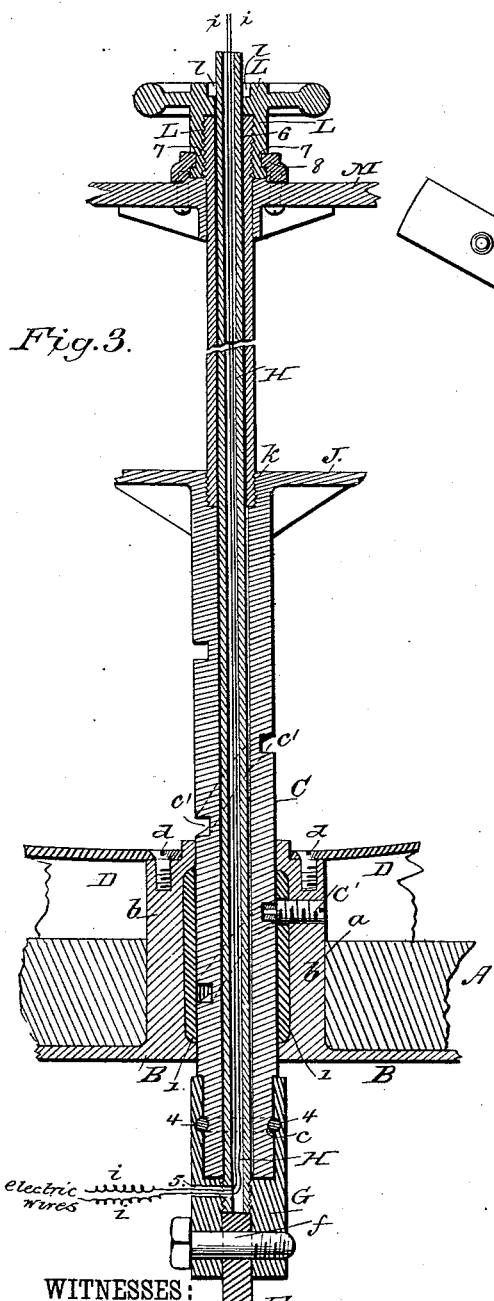
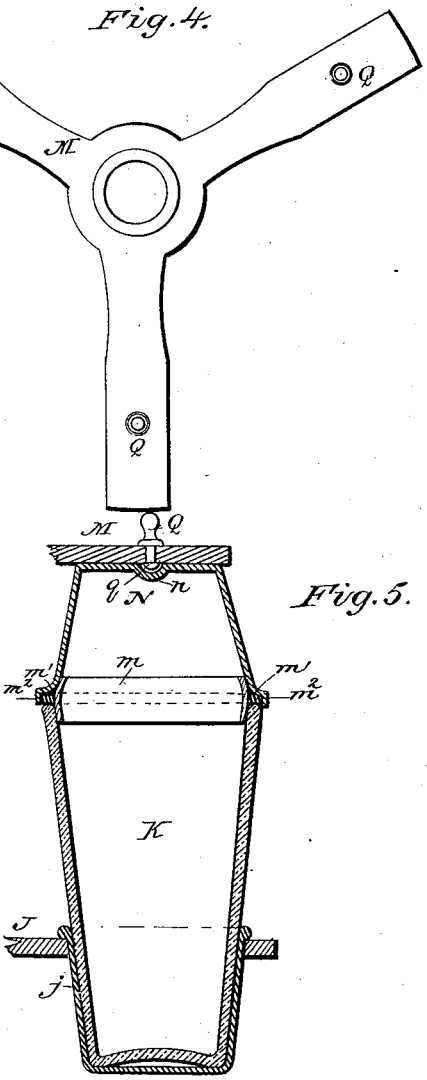
WITNESSES:
Fred J. Dieterich
P. B. Turpin
INVENTOR:
Chas. Collins
BY Munn & Co.
ATTORNEYS.

UNITED STATES PATENT OFFICE.

CHARLES COLLINS, OF DOCTOR TOWN, GEORGIA.

SHAKING APPARATUS.

SPECIFICATION forming part of Letters Patent No. 366,460, dated July 12, 1887.

Application filed February 12, 1887. Serial No. 227,435. (No model.)

*To all whom it may concern:*

Be it known that I, CHARLES COLLINS, of Doctor Town, in the county of Wayne and State of Georgia, have invented a new and useful Improvement in Shaking Apparatus, of which the following is a specification.

My invention is an improved shaking apparatus for mixing fancy drinks—such as lemonades, punches, and the like—and seeks to provide an apparatus that will be ornamental and attractive in a bar-room or other place where it may be desired to dispense such drinks, and which will efficiently mix such drinks when properly operated.

The invention consists in certain novel constructions and combinations of parts, as will be described.

In the drawings, Figure 1 is a side view, part in section, of my apparatus. Fig. 2 is a detail view of the glass-carrier proper. Fig. 3 is a detached longitudinal section of a part of the apparatus. Fig. 4 is a detail view of the presser. Fig. 5 is a detail view of parts of the glass-carrier, the presser, and a cover for the glass, the glass being shown in position; and Fig. 6 is a detail view.

In my invention I seek to provide glass supports and means for reciprocating and rotating the same, together with an electric lamp or similar ornament and a non rotating support therefor.

In carrying out my invention I employ a suitable bench or frame, A, which may be the counter of a bar, and in it I form an opening, $a$, for the boss $b$ on the bracket B. This boss forms a bearing for the plunger-rod C, which moves through it, and the boss extends above the bench, as shown. A suitable tray or drip-pan, D, surrounds the boss and is secured to it, usually by screws $d$. Babbitt-metal linings are formed at 1 in the boss $b$, and also at 2 in the bearing 3 for shaft E, which has its crank-pin $e$ connected by pitman F with the joint-piece G, the pitman being pivoted at $f$ to said joint-piece. This joint-piece has its upper end socketed to receive the lower end of the plunger-rod, which has an annular groove, $c$, entered by one or more pins, 4, passed through the socket-piece, so the plunger-rod is held to the joint-piece, and yet can turn or rotate independently thereof. Thus the joint-piece, connected as described, forms practically a universal joint between the pitman and the plunger-rod.

The plunger-rod has a spiral groove, $c'$, formed in it, and a removable pin or stud, $C'$, is threaded through the boss $b$ and enters the spiral groove, by which construction, when the parts are as shown in Fig. 3, the plunger-rod is given a rotary motion as it is reciprocated.

The ornament-support H is fitted within the tubular plunger-rod and extends down into the joint-piece G, being preferably threaded into a socket in said joint-piece. The ornament I is preferably an incandescent electric lamp, and is mounted on the upper end of the support H. The wires $i\ i$ lead down through this support H and out through an opening, 5, extending through the sides of support H and of joint-piece G. It will be noticed that by reason of the construction as described the ornament-support is not given any rotary motion, but is simply reciprocated in the operation of the apparatus. On the plunger-rod I support the glass-carrier J, having sockets or receptacles $j$ for the glasses K. The plunger-rod is extended above the carrier, the extension being preferably threaded at $k$ to the main portion of the plunger-rod. The upper end of the rod is threaded at 6, and the screw L, having an internal thread, is screwed on said threaded end 6, and has its lower end formed with a groove, 7, to receive one or more flanged plates, 8, secured to the presser M. This presser bears on the covers N of the glasses, and is adjusted down or up to clamp or release such covers, as may be desired. The presser, it will be seen, may, when released, be turned over or clear of covers N; and to enable it to be accurately stopped in both positions I provide a stop-pin, 9, on the plunger-rod, which is engaged by shoulders 10 on the presser, such shoulders being arranged to abut the pin and stop the presser when properly over or clear of the covers. When over the covers, the presser may be clamped down thereon by the screw L, as will be understood from Figs. 1 and 3.

In the upper end of the screw L, I form a depression or socket, $l$, into which the electric lamp extends, so the joint between the rotating and non-rotating parts of the device will not be prominent, and hardly noticeable.

The covers M have a ring, m, fixed to them and extended down below their mouths, such ring being formed to fit within the mouth of the glass and steady the cover in position. This ring and the rim of the cover form between them a groove, m', in which a rubber or other suitable packing, $m^2$, is placed.

The operation will be readily understood. As the shaft is turned the plunger-rod will be reciprocated and rotated and the articles to be mixed will be agitated, as desired. When desired, an electric, water, spring, or other motor may be connected to the shaft, to the end of driving the same; and to facilitate the attachment of such motor I provide screws or bolts N' on the bracket B, adjacent the main shaft, as shown in Fig. 1.

In Fig. 1 I show at O the water-motor in position for driving the shafts, parts being broken away, and in Fig. 6 is shown in detail the valve P, for regulating the flow of the water. On the arms of the presser I mount, form, or secure knobs Q, to facilitate the manipulation of such presser, and on their under sides the arms have projections q, which may be extensions of the knobs, as shown. These projections enter recesses n in covers N, and serve to secure such parts firmly in position.

Having thus described my invention, what I claim as new is—

1. In a shaking apparatus, the combination of a tubular plunger, a frame through which said plunger may be reciprocated, an ornament-support extended through said plunger, and an ornament mounted on said support, the plunger being free to turn on the ornament-support, substantially as set forth.

2. In a shaking apparatus, the combination, with the tubular plunger and a frame through which said plunger may be reciprocated, of the ornament-support extended therethrough and having a wire passage, the lamp mounted on said support, and the wires leading through the plunger and support to said lamp, substantially as set forth.

3. The combination of the tubular plunger, the joint-piece swiveled to said plunger, the ornament-support connected with the joint-piece, the wires leading through the joint-piece into the ornament-support, and the ornament, substantially as set forth.

4. The combination, in a shaking apparatus, of the boss or guide-tube, the plunger movable therethrough and having a spiral groove, and the removable pin or stud fitted to enter said groove, substantially as set forth.

5. The combination, with the plunger-rod having threads and the glass-supports, of the presser and the presser-screw connected with the presser and threaded on the plunger, substantially as and for the purposes specified.

6. The combination of the plunger having a stop-pin, and the presser journaled on the plunger and having shoulders located on opposite sides of the stop-pin and arranged to stop the presser in its different positions, substantially as set forth.

7. The combination, with the plunger having a stop-pin, and the presser having shoulders arranged to engage said pin, of the clamp for securing said presser in its operative position, substantially as set forth.

8. The combination, in a shaking apparatus, of the plunger-rod, a frame through which the said plunger-rod may be reciprocated, the lamp, and the wires leading to said lamp through the plunger-rod, substantially as set forth.

9. In a shaking apparatus, a tubular plunger and a joint-piece swiveled thereto, combined with the ornament-support extended through the plunger and connected with the joint-piece, substantially as and for the purposes specified.

10. In a shaking apparatus, the combination, with the plunger-rod and means for rotating the same, of an electric lamp and a non-rotating support therefor located partially within the plunger-rod, substantially as set forth.

CHARLES COLLINS.

Witnesses:
ELIAS C. FORT,
O. F. LITTLEFIELD.